(12) United States Patent
Lam et al.

(10) Patent No.: US 10,178,591 B2
(45) Date of Patent: Jan. 8, 2019

(54) CLIENT-BASED ACCESS NETWORK HANDOVER

(71) Applicant: Verizon Patent and Licensing Inc., Arlington, VA (US)

(72) Inventors: Andrew Wahlon Lam, River Edge, NJ (US); Sameh El-Gawady, Waltham, MA (US); Vered Ben-Anat, Cambridge, MA (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 15/150,209

(22) Filed: May 9, 2016

(65) Prior Publication Data

US 2017/0325142 A1     Nov. 9, 2017

(51) Int. Cl.
*H04W 36/14* (2009.01)
*H04L 29/06* (2006.01)
*H04W 36/00* (2009.01)
*H04W 84/04* (2009.01)

(52) U.S. Cl.
CPC ......... *H04W 36/14* (2013.01); *H04L 65/1006* (2013.01); *H04L 65/1016* (2013.01); *H04L 65/1073* (2013.01); *H04L 65/1083* (2013.01); *H04W 36/0011* (2013.01); *H04W 84/042* (2013.01)

(58) Field of Classification Search
CPC ......... H04W 36/0011; H04W 36/0016; H04W 36/0022; H04W 36/0027; H04W 36/14; H04W 36/16; H04W 36/18; H04W 76/10; H04W 76/11; H04L 65/1016; H04L 65/1059; H04L 65/1066; H04L 65/1069
See application file for complete search history.

(56) References Cited

U.S. PATENT DOCUMENTS

| | | | |
|---|---|---|---|
| 9,532,276 B1 * | 12/2016 | Malhotra | H04W 36/0022 |
| 2009/0097450 A1 * | 4/2009 | Wallis | H04W 36/0022 370/331 |
| 2009/0109899 A1 * | 4/2009 | Hamada | H04W 36/22 370/328 |
| 2009/0196286 A1 * | 8/2009 | Long | H04L 45/306 370/352 |

(Continued)

*Primary Examiner* — Paul H Masur

(57) ABSTRACT

A method including determining that a device is connected to a first communication network; establishing, via the first communication network, a multimedia session with the device serving as a first endpoint of the multimedia session via the first communication network; determining that the device is connected to a second communication network while the multimedia session is ongoing, wherein the second communication network is different than the first communication network; requesting via the second communication network, in response to determining that the device is connected to the second communication network while the multimedia session is ongoing, that the first endpoint of the multimedia session be replaced with the device serving as a second endpoint of the multimedia session via the second communication network; and continuing, after the request that the first endpoint of the multimedia session be replaced, the multimedia session via the second communication network.

20 Claims, 5 Drawing Sheets

(56) References Cited

U.S. PATENT DOCUMENTS

| | | | |
|---|---|---|---|
| 2009/0268655 A1* | 10/2009 | Bertz | H04W 36/0055 370/312 |
| 2010/0011112 A1* | 1/2010 | Song | H04W 36/0011 709/228 |
| 2011/0149750 A1* | 6/2011 | Sharma | H04W 36/14 370/252 |
| 2011/0211525 A1* | 9/2011 | Mahdi | H04W 36/0022 370/328 |
| 2013/0100950 A1* | 4/2013 | Jin | H04W 36/0022 370/352 |
| 2013/0120519 A1* | 5/2013 | Jin | H04W 36/0022 348/14.02 |
| 2015/0207827 A1* | 7/2015 | Jheng | H04W 36/0022 370/260 |
| 2016/0234727 A1* | 8/2016 | Sridhar | H04L 65/1069 |

* cited by examiner

CLIENT-BASED ACCESS NETWORK HANDOVER

BACKGROUND

With the increased use of 3GPP (3rd Generation Partnership Project) LTE (Long-Term Evolution) based cellular data technologies, IMS (IP Multimedia Subsystem) has experienced a significant rollout. In addition to making use of IEEE standardized protocols such as SIP (Session Initiation Protocol), IMS was also designed to be access-agnostic. As a result, communication service providers have made IMS-based services available to other, non-cellular enabled, devices via the Internet, often using Internet-connected WiFi routers as access networks. While this makes available many interesting communication options on a wider range of devices, use of short range access networks can result in issues in maintaining multimedia sessions as a user moves from one access network to another.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
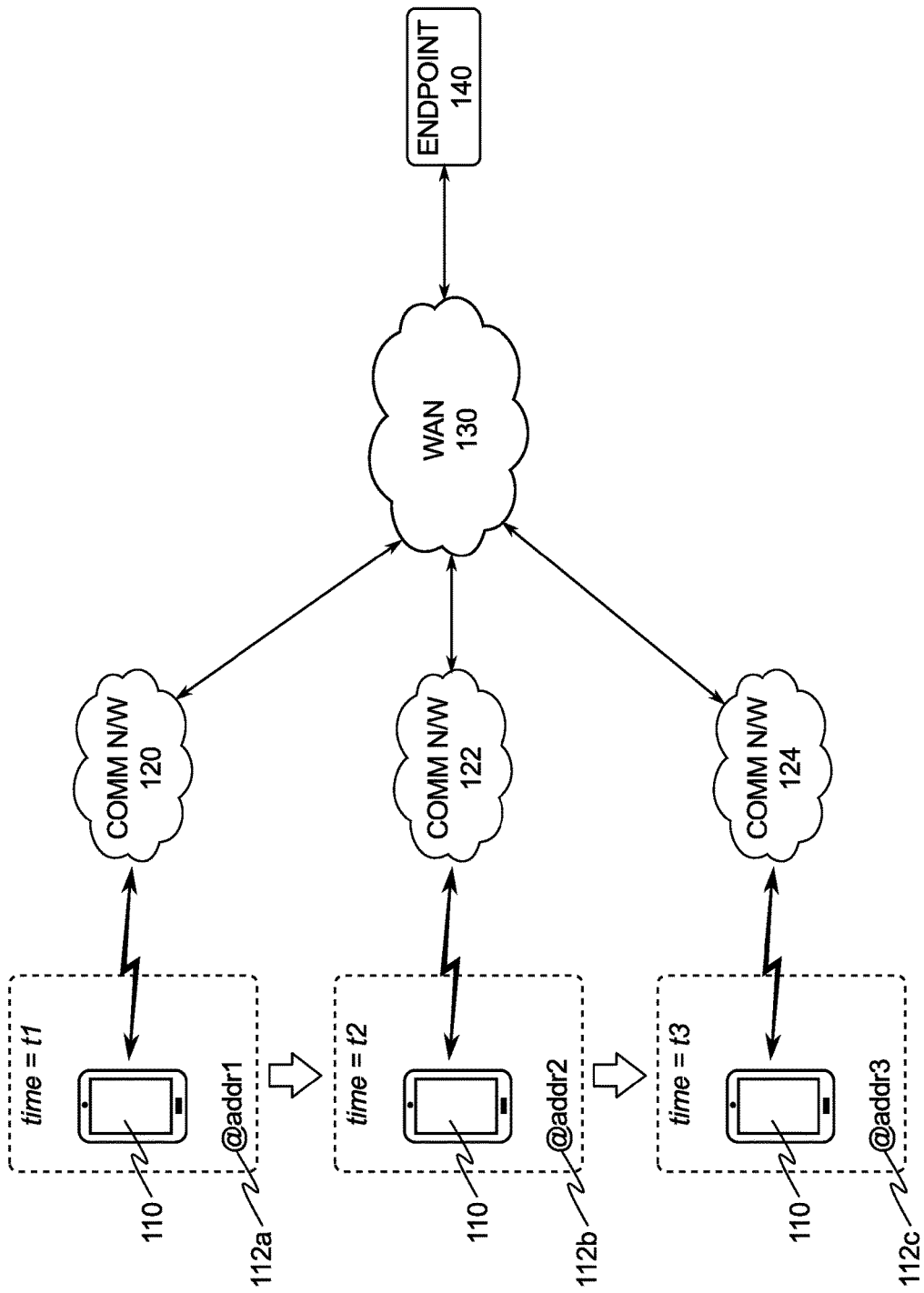
FIG. 1 illustrates an example in which a client device continues a multimedia session with an endpoint while connecting to multiple communication networks.

FIG. 1 illustrates an example in which a client device 110 continues a multimedia session with an endpoint 140 while connecting to multiple communication networks 120, 122, and 124. FIG. 1 illustrates an example in which client device 110 is a tablet computer. However, client device 110 may be embodied in other form factors such as, but not limited to, a smartphone, a smartwatch, a fitness tracker, smart glasses, a gaming machine, a set-top box, a camera, a peripheral device, a wearable device, a personal digital assistant, a notebook computer, or a desktop computer.

During a first time period t1, client device 110 is connected to, and transfers data via, a first communication network 120. The connection between client device 110 and first communication network 120 may be via a hardwired or wireless connection. Client device 110 may establish and maintain a wireless data connection with first communication network 120 via, for example, cellular data communication (for example, according to various 2G, 3G and 4G cellular network technologies), WiFi (a general term for devices and protocols in accordance with various aspects of the IEEE 802.11 standard), optical data communication (for example, infrared- and laser-based communication), and wireless personal area network technologies (for example, ANT, UWB, Bluetooth, ZigBee, and Wireless USB). Client device 110 includes hardware, such as a transceiver or modem, and may also include corresponding firmware and/or other software, effective for transferring data via communication network 110. In some examples, client device 110 may be connected to first communication network 120 via an intermediate network connection; for example, a smart watch may utilize a Bluetooth-based networking connection with a smartphone to make use of a cellular data communication network to which the smartphone is connected. In some implementations, first communication network 120 may be a small local area network, such as a network provided by a wireless access point within a home. In some implementations, communication network 120 may be a more wide-ranging network, such as a cellular data network spanning a significant geographical area.

First communication network 120 is connected to wide area network (WAN) 130, such that first communication network 120 may transfer data to and from WAN 130 and devices connected to WAN 130, such as endpoint 140. Examples of WAN 130 include, but are not limited to, the Internet and an internal business network extending over a significant geographical distance. Accordingly, via first communication network 120, client device 110 may also transfer data to and from WAN 130 and devices connected to WAN 130 during the time period t1 that client device 110 is connected to first communication network 120. While client device 110 is connected to the first communication network 120, client device 110 is associated with a first network address 112a on WAN 130, illustrated by "@addr1," such that data may be provided, by endpoint 140, for example, to client device 110 by directing it to the first network address 112a on WAN 130. In some examples, the first communication network 120 may perform network address translation (NAT), such that client device 110 is associated with a different network address, such as an address within the private address ranges specified in IETF (Internet Engineering Task Force) RFC 1918 "Address Allocation for Private Internets" (10.0.0.0 to 10.255.255.255, 172.16.0.0 to 172.31.255.255, and 192.168.0.0 to 192.168.255.255 for IPv4 addressing), than the first network address 112a. For example, a router installed at a user's home may allow multiple devices, including client device 110, to share a single network address on WAN 130 that has been associated with the router.

In the example illustrated in FIG. 1, while connected to first communication network 120 during time period t1, client device 110 establishes a multimedia session with endpoint 140 via first communication network 120. As a result, client device 110 and endpoint 140 each serve as endpoints of the multimedia session. In some implementations, Session Initiation Protocol (SIP), which is described in IETF RFC 3261 (which is incorporated by reference herein in its entirety), may be used to establish a SIP "call" between client device 110 and endpoint 140 for the multimedia session. In such implementations, client device 110 and endpoint 140 may each be configured to function as SIP endpoints. In some implementations, SIP proxy servers (not illustrated in FIG. 1), included in and/or connected to first communication network 120 and/or WAN 130, may be used to establish the SIP call. The multimedia session may be used for purposes such as, but not limited to, voice conferencing, video conferencing, streaming multimedia distribution, instant messaging, presence information, file transfer, fax over IP, and online gaming. Client device 110 may initiate the multimedia session (for example, by transmitting a SIP INVITE message to initiate a SIP call). Endpoint 140 may initiate the multimedia session (for example, by transmitting a SIP INVITE message to initiate a SIP call). Once the multimedia session has been established, client device 110 and endpoint 140 may exchange data according to a predetermined protocol via first communication network 120 and WAN 130, with data transmitted by endpoint 140 being directed to the first network address 112a (illustrated as "@addr1" in FIG. 1).

During a second time period t2, after time period t1, client device 110 is connected to, and transfers data via, a second communication network 122 that is different than first communication network 120. The connection of client device 110 to second communication network 122 may be a result of client device 110 physically moving within range of second communication network 122 (where, for example, second communication network 122 provides a wireless networking connection for client device 110) and/or client device 110 being physically attached to second communication network 122 (for example, by attachment of a cable to client device 110). The connection of client device 110 to second communication network 122 may be a result of losing the connection between client device 110 and first communication network 120. For example, client device 110 may be configured to connect to a cellular data network if it loses an initial connection with a WiFi network. In some situations, there may be a period of time between period t1 and period t2 when client device 110 is connected to neither first communication network 120 nor second communication network 122. For example, if a multimedia session is initiated while client device 110 is connected to first communication network 120, after which client device 110 is not connected to any network for a brief period of time (such as less than a timeout period for the multimedia session), and then client device 110 connects to second communication network 122, the multimedia session may be continued via the second communication network 122. In some situations, during a portion or all of time period t2, client device 110 may be connected to both first communication network 120 and second communication network 122. For example, first communication network 120 may be a cellular data network with a wide coverage area and second communication network 122 may be WiFi network with a more limited coverage area. In such situations, client device 110 may be configured to preferentially use second communication network 122, rather than first communication network 120, for some or all data communications. For example, WiFi network usage may be preferred over cellular data network usage, to avoid incurring usage cellular data network resources. In some situations, the connection between client device 110 and first communication network 120 may be terminated in response to connecting to second communication network 122. For example, communication may be performed via second communication network 222 using less power than if performed via first communication network 220.

Second communication network 122 is connected to WAN 130, such that second communication network 122 may transfer data to and from WAN 130 and devices connected to WAN 130, such as endpoint 140. Accordingly, via second communication network 122, client device 110 may also transfer data to and from WAN 130 and devices connected to WAN 130 during the time period t2 that client device 110 is connected to second communication network 122. While client device 110 is connected to the second communication network 122, client device 110 is associated with a second network address 112b on WAN 130, illustrated by "@addr2," that is different from the first network address 112a, such that data may be provided, by endpoint 140, for example, to client device 110 by directing it to the second network address 112b on WAN 130. In some examples, the second communication network 122 may perform network address translation (NAT), much as discussed above with respect to the first communication network 120.

Client device 110 is configured to determine when client device 110 has connected to second communication network 122. For example, an operating system software executing on client device 110 may be configured to configure and control communication hardware to connect to second communication network 122, and in response to connecting to second communication network 122 provide a notification to software on client device 110 that client device 110 has connected to second communication network 122. In response to determining client device 110 has connected to second communication network 122 while the multimedia session initially established via first communication network 120 is ongoing, client device 110 is configured to issue a request, transmitted via second communication network 122, for the endpoint of the multimedia session terminating at client device 110 (specifically, client device 110 serving as an endpoint via the first communication network 120) to be replaced with client device 110 serving as a replacement endpoint via the second communication network 122. This request may be transmitted to a system included in WAN 130, a system connected to WAN 130, or endpoint 140. There are various techniques by which the request may be handled by various systems. In a first example, endpoint 140 may receive the request, or another request issued by another system that received the original request, and in response establish a new communication session between itself and client device 110 via the second communication network 122 to replace a communication session previously established between itself and client device 110 via the first communication network 120. In a second example, the multimedia session may pass through a proxy server, and the proxy server may be configured to transfer data between endpoint 140 and client device 110 via second communication network 122, rather than between endpoint 140 and client device 110 via first communication network 120, such that endpoint 140 does not need to change the destination to which it transmits data. In a third example, a network element located in second communication network 122, WAN 130, or between WAN 130 and endpoint 140 may be configured to perform network address translation, such that the same network addresses continue to be used by client device 110 and endpoint 140 for transferring data for the multimedia session, but the network element redirects data directed to the first network address 112a to instead go to the second network address 112b. These are merely examples, and other methods may be used.

As a result of the request being successfully processed, data transmitted by endpoint 140 for the multimedia session is no longer delivered to the first network address 112a, but instead is delivered to the second network address 112b.

Accordingly, the multimedia session between client device 110 and endpoint 140 continues via the second communication network 122. In some situations, such as where the multimedia session is used for real time streaming of audio and/or video data, there may be a period during which the multimedia stream is interrupted and real time streaming does not occur. In some situations, interruptions in the multimedia session due to handover from one endpoint to another may be addressed by advance buffering or retries. It is noted that in some situations, a handover of the multimedia session to the second communication network 122 may be unsuccessful due to, for example, too much time passing between time periods t1 and t2 (for example, a period of time during which client device 110 lacks connectivity) or too much time passing between t1 and client device 110 being able to successfully communicate with endpoint 140 via second communication network 122. For example, in response to data for the multimedia session no longer being received via first communication network 120, a timeout timer (that runs for, for example, 10-20 seconds) may be started, on client device 110 and/or endpoint 140. If the multimedia session is not continued via second communication network 122 before the timeout timer expires, the multimedia session may be dropped.

During a third time period t3, after time period t2, client device 110 may be connected to, and transfer data via, a third communication network 124 that is different than second communication network 122. The connection of client device 110 to third communication network 124 may be a result of client device 110 physically moving within range of third communication network 124 (where, for example, third communication network 124 provides a wireless networking connection for client device 110) and/or client device 110 being physically attached to third communication network 124 (for example, by attachment of a cable to client device 110). The connection of client device 110 to third communication network 124 may be a result of losing the connection between client device 110 and second communication network 122. In some situations, there may be a period of time between period t2 and period t3 when client device 110 is connected to neither second communication network 122 nor third communication network 124. In some situations, during a portion or all of time period t3, client device 110 may be connected to both second communication network 122 and third communication network 124, or to both first communication network 120 and third communication network 124. In such situations, client device 110 may be configured to preferentially use third communication network 124, rather than second communication network 122 or first communication network 120, for some or all data communications. In some situations, the connection between client device 110 and second communication network 122 may be terminated in response to connecting to third communication network 124.

Third communication network 124 is connected to WAN 130, such that third communication network 124 may transfer data to and from WAN 130 and devices connected to WAN 130, such as endpoint 140. Accordingly, via third communication network 124, client device 110 may also transfer data to and from WAN 130 and devices connected to WAN 130 during the time period t3 that client device 110 is connected to third communication network 124. While client device 110 is connected to the third communication network 124, client device 110 is associated with a third network address 112c on WAN 130, illustrated by "@addr3," that is different from the second network address 112b, such that data may be provided, by endpoint 140, for example, to client device 110 by directing it to the third network address 112c on WAN 130. In some examples, the third communication network 124 may perform network address translation (NAT), much as discussed above with respect to the first communication network 120.

Client device 110 is configured to determine when client device 110 has connected to third communication network 124, much as client device 110 is configured to determine when client device 110 has connected to second communication network 122. In response to determining client device 110 has connected to third communication network 124 while the multimedia session initially established via first communication network 120 is ongoing via the second communication network 122, client device 110 is configured to issue a request, transmitted via third communication network 124, for the endpoint of the multimedia session terminating at client device 110 (specifically, client device 110 serving as an endpoint via the second communication network 122) to be replaced with client device 110 serving as a replacement endpoint via the third communication network 124. This is performed in much the same way discussed above in connection with the request for the endpoint of the multimedia session terminating at client device 110 to be replaced with client device 110 serving as a replacement endpoint via the second communication network 122. As a result of the request being successfully processed, data transmitted by endpoint 140 for the multimedia session is no longer delivered to the second network address 112b, but instead is delivered to the third network address 112c. Accordingly, the multimedia session between client device 110 and endpoint 140 continues via the third communication network 122.

Figure 2:
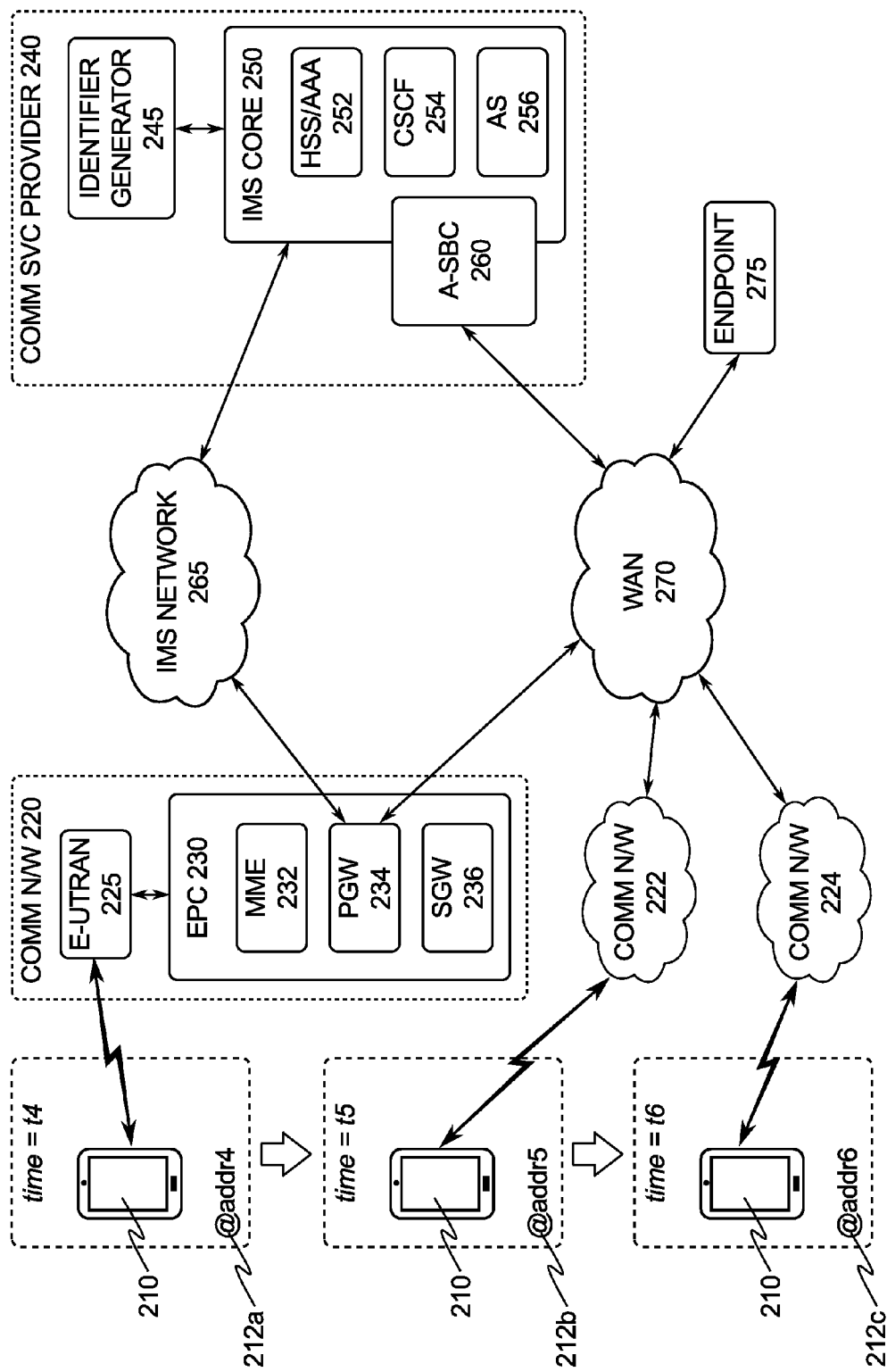
FIG. 2 illustrates another example in which a client device continues a multimedia session with an endpoint while connecting to multiple communication networks.

FIG. 2 illustrates another example in which a client device 210 continues a multimedia session with an endpoint 275 while connecting to multiple communication networks 220, 222, and 224. The example illustrated in FIG. 2 may be viewed as a more specific example of the example illustrated in FIG. 1. In the example illustrated in FIG. 2, a first communication network 220 is a cellular data network. Much as with FIG. 1, FIG. 2 illustrates an example in which client device 210 is a tablet computer, but client device 210 may be embodied in other form factors such as, but not limited to, a smartphone, a smartwatch, a fitness tracker, smart glasses, a gaming machine, a set-top box, a camera, a peripheral device, a wearable device, a personal digital assistant, a notebook computer, or a desktop computer.

During a first time period t4, client device 210 is connected to, and transfers data via, first communication network 220. As noted above, the first communication network 220 is a cellular data network. Specifically, the first communication network 220 is implemented with a 3GPP (3rd Generation Partnership Project) LTE (Long-Term Evolution) cellular data network, although this disclosure is not limited to LTE networks, and other cellular data technologies may be used. Only a portion of the elements included in the LTE cellular data network are illustrated in FIG. 2. First communication network 220 includes E-UTRAN (Evolved Terrestrial Radio Access Network) 225 and EPC (Evolved Packet Core) 230. First communication network 220 is configured to interoperate with services and systems operated by communication service provider 240, such as, but not limited to IMS (IP Multimedia Subsystem) Core 250. Communication service provider 240 may also operate an identifier generator 245. Communication service provider 240 may also operate an A-SBC (Access Session Border Controller) 260. The architecture illustrated in FIG. 2 is merely an example, and may vary due to factors such as a technique utilized for roaming between two communication service providers. In some examples, the first communication network 220 may be operated by communication service provider 240.

E-UTRAN 225 provides a wireless radio interface via which client device 210 connects with first communication network 220. In some situations, client device 210 may be indirectly connected to first communication network 220 via another device (not illustrated in FIG. 2) that is configured to connect to first communication network 220. For example, client device 210 may lack a SIM, a R-UIM, or other component that would enable client device 210 to be authenticated via E-UTRAN 225. For example, client device 210 may be a smart watch which establishes a PAN connection, such as via Bluetooth, with a smartphone device that is configured to connect to first communication network 220 and share data network resources provided by first communication network 220 via the Bluetooth connection. Client device 210 includes hardware, such as a transceiver or modem, and may also include transceiver or modem, and may also include corresponding firmware and/or other software, effective for transferring data via first communication network 220, whether client device 210 is directly or indirectly connected to first communication network 220. Client device 210 communicates with EPC 230 via E-UTRAN 225. EPC 230 includes MME (Mobility Management Entity) 232, PGW (Packet Data Network Gateway) 234, and SGW (Serving Gateway) 236. E-UTRAN 220 may receive traffic from and/or send traffic to IMS Core 250 and/or WAN 270 via PGW 234 and SGW 236.

SGW 236 may include one or more network devices, such as a gateway, a router, a modem, a switch, a firewall, a NIC (network interface card), a hub, a bridge, a proxy server, an OADM (optical add-drop multiplexer), or other types of devices that process and/or transfer data traffic. SGW 236 may, for example, aggregate traffic received from one or more base stations and may send the aggregated traffic to IMS Core 250 or WAN 270 via PGW 234. In some implementations, SGW 236 may route and forward user data packets, may act as a mobility anchor for a user plane during handovers between base stations, and may act as an anchor for mobility between LTE and other 3GPP technologies.

MME 232 may include one or more network devices configured to perform operations associated with handoffs to/from first communication network 220. MME 232 may perform operations to register client device 210 with first communication network 220, to handoff client device 210 from first communication network 220 to another cellular network, to handoff client device 210 from another cellular network to first communication network 220, and/or perform other operations. MME 232 may perform policing operations for traffic destined for and/or received from client device 210. MME 232 may authenticate or register client device 210 via interaction with HSS/AAA server 252.

PGW 234 may include one or more network devices, such as a gateway, a router, a modem, a switch, a firewall, a NIC, a hub, a bridge, a proxy server, an OADM, or other types of devices that process and/or transfer data traffic. PGW 234 may, for example, provide connectivity of client device 210 to external packet data networks, such as IMS network 265 and WAN 270 by being a traffic exit/entry point for client device 210. PGW 234 may perform policy enforcement, packet filtering, charging support, lawful intercept, and/or packet screening. PGW 234 may also act as an anchor between 3GPP and non-3GPP technologies.

IMS Core 250, which is operated by communication service provider 240, includes HSS/AAA (Home Subscriber Server/Authentication, Authorization and Accounting) server 252, CSCF (Call Session Control Function) server 254, and AS (Application Server) 256. HSS/AAA server 252 may include one or more computing devices, such as a server device or a collection of server devices. In some implementations, HSS/AAA server 252 may include a device that gathers, processes, searches, stores, and/or provides information in a manner described herein. For example, HSS/AAA server 252 may manage, update, and/or store, in a memory or storage device associated with HSS/AAA server 252, profile information associated with client device 210 associated with an identifier that identifies applications and/or services that are permitted for and/or accessible via client device 210, such as, but not limited to, roaming network access services, bandwidth or data rate thresholds associated with the applications or services, information associated with an account or user (for example, a username, a password, or a PIN (personal identification number)), rate information, minutes allowed, and/or other information.

Additionally, or alternatively, HSS/AAA server 252 may perform authentication, authorization, and/or accounting operations associated with a communication connection for client device 210 involving communication server provider 240. In some implementations, HSS/AAA server 252 may maintain billing information and may assess charges and credits to an account or user associated with client device 210 based on received network usage information, such as information received from EPC 230 or A-SBC 260. Additionally, or alternatively, HSS/AAA server 252 may store information regarding a primary identifier and an alternate identifier that have been associated to client device 210; for example, by identifier generator 245.

HSS/AAA server 252 may be configured to receive and store information from identifier generator 245 associated with a primary identifier and an alternate identifier generated for client device 210. Subsequently, HSS/AAA server 252 may evaluate an identifier provided by client device 210, for example, evaluation of the provided identifier against the stored primary and alternate identifiers, to determine whether client device 210 is authorized to access data and/or communication services provided by communication service provider 240. For example, HSS/AAA server 252 may identify a particular account, user, or user device associated with client device 210 based on an identifier received from client device 210, and in response HSS/AAA server 252 may identify privileges, costs, usage limitations, etc. associated with the identified account, user, or user device.

In this way, HSS/AAA server 252, other components of IMS Core 250, or other components operated by communication service provider 240, may function to provide traffic or otherwise provide services without requiring changes to program components for the IMS Core 250 or other components illustrated in FIG. 2. Avoiding changes to such program components may be facilitated by utilizing the 15-digit IMSI (international mobile subscriber identity) number format for the primary and alternate identifiers. For example, user device 210 may appear as a normal cellular connected device to such components (as opposed to a WiFi-only device without an IMSI). For example, certain technologies allow a user to be selectively reached at different devices at different times (for example, calls are directed to client device 210 during working hours, and a different device, associated with the same account or user as client device 210, during other times), and such technologies may be used with client device 210, whether it is connected to first communication network 220, second communication network 222, or third communication network 224, without reprogramming network components to forward communications to client device 210 at desired times, by use of the primary or alternate identifier associated with client device 210.

CSCF server 254 may include one or more computing devices that route IMS traffic to and from client device 210. For example, CSCF server 254 may process traffic, associated with services provided by the IMS Core 250, that is destined for client device 210. In another example, CSCF server 254 may process traffic, received from client device 210, that is destined for IMS Core 250. CSCF server 254 interacts with client device 210 via SIP to establish multimedia sessions, such as a multimedia session between client device 210 and endpoint 275. CSCF server 254 may include a P-CSCF (Proxy CSCF), which acts as an entry point for client device 210 into IMS Core 250; an I-CSCF (Interrogating CSCF), which acts as an inbound proxy server which directs communication according to information received from HSS/AAA server 252; and a S-CSCF (Serving CSCF) which may be configured to register or authenticate users and serve as a call server that ensures SIP dialog establishment and invokes any required services. The S-CSCF identifies and interacts with an AS (application server) 256 in order to establish a multimedia session between client device 210 and endpoint device 275.

Identifier generator 245 may generate identifiers to be associated with client device 210, including a primary identifier and an alternate identifier, which may be used by client device 210 to access communications and/or data services available through communication service provider 240. As part of a registration process to register client device 210 with communication service provider 240, identifier generator 245 may generate two identifiers which are associated with client device 210: a primary identifier and an alternate identifier. These identifiers may be referred to as "private identifiers," and may be stored by client device 210 for later registration or authentication with elements operated by communication service provider 240, such as CSCF 254 or HSS/AAA server 252. For example, the identifiers generated by identifier generator 245 may each be in the form of a locally-assigned IMSI that includes 15 digits. The locally-assigned IMSIs may each include a 3 digit artificial MCC (mobile country code) portion. For example, certain numeric values, such as "000," are reserved from use as MCC and are generally not assigned to IMSIs associated with cellular communication devices, and identifier generator 245 may generate a locally-assigned IMSI that includes one of these reserved values. In another example, a smallest currently used MCC value is "202" (associated with Greece), and a largest currently used MCC value is "901" (associated with satellite networks and Antarctica); identifier generator 245 may generate a locally-assigned IMSI that includes an artificial MCC that is outside the range of officially used values (in other words, having a value less than 202 or more than 901). In this way, identifier generator 245 may generate a locally-assigned IMSI that is unlikely to conflict with an actual IMSI assigned to a cellular communication device.

Identifier generator 245 may be configured to form a locally-assigned IMSI to include a telephone number or other identifier associated with an account, user, or user device associated with client device 210. For example, if client device 210 is registered with communication service provider 240 in association with a user device (for example, a smartphone) that is associated with a telephone number "222-555-1212," identifier generator may generate a primary identifier with a value of "000-2225551212-01" and an alternate identifier with a value of "000-2225551212-10." Similar schemes may be employed to encode an account or user identifier in a locally assigned IMSI value. If identifiers are generated according to such a scheme, when client device 210 presents either its primary or alternate identifier, a component operated by communication service provider 240 (for example, HSS/AAA server 252) may parse the identifier to identify an account or user associated with client device 210. In response to identifying which account, user, or user device is associated with client device 210, communication service provider 240 may further assign rights, privileges, and/or limitations to client device 210 based on rights, privileges, and/or limitations assigned to the identified account, user, or user device. For example, communication service provider 240 may automatically forward a message (such as a text or other short messaging service (SMS) message) directed to a smartphone to an associated client device, such as client device 210.

More than one client device may be associated with a particular account, user, or user device. Identifier generator 245 may be configured to form a locally assigned IMSI to include a value that is incremented, or otherwise calculated, for each client device, such as client device 210, that is registered with communication service provider 240. For example, client device 210 may be the first client device registered with communication service provider 240 in association with the smartphone mentioned in the previous paragraph, and as a result identifier generator 245 may associate a primary identifier of "000-2225551212-01" and an alternate identifier of "000-2225551212-10" (where the counter value portion of the alternate identifier is multiple—here 10 times—of the counter value portion of the primary identifier) with client device 210. After that, a second client device (not illustrated in FIG. 2) may be registered with communication service provider 240 in association with the same smartphone, and as a result identifier generator 245 may associate a primary identifier of "000-2225551212-02" (where the counter value portion is incremented by one over the counter value portion of the primary identifier for client device 210) and an alternate identifier of "000-2225551212-20" with the second client device. Communication service provider 240 may assign various rights, privileges, and/or limitations to individual client devices.

Although illustrated as a separate component in FIG. 2, it should be appreciated that identifier generator 245 may be included in or otherwise coupled to another component operated by communication service provider 240. For example, identifier generator 245 may be included in a component of IMS Core 250, such as HSS/AAA server 252, or identifier generator 240 may be located remotely from IMS Core 250.

First communication network 220 is connected to WAN 270, such that first communication network 220 may transfer data to and from WAN 270 and devices connected to WAN 270, such as endpoint 275. Accordingly, via first communication network 220, client device 210 may also transfer data to and from WAN 270 and devices connected to WAN 270 during the time period t4 that client device 210 is connected to first communication network 220. While client device 210 is connected to the first communication network 220, client device 210 is associated with a first network address 212b on WAN 270, illustrated by "@addr4," such that data may be provided, by endpoint 275, for example, to client device 210 by directing it to the first network address 212b on WAN 270. In some examples, the first communication network 120 may perform network address translation (NAT), much as discussed above with respect to the first communication network 120 in FIG. 1.

In the example illustrated in FIG. 2, while connected to first communication network 220 during time period t4, client device 210 establishes a multimedia session with endpoint 275 via first communication network 220 with assistance from IMS Core 250. As a result, client device 210 and endpoint 275 each serve as endpoints of the multimedia session. Via IMS Core 250, SIP is used to establish a SIP "call" between client device 210 and endpoint 275 for the multimedia session. Prior to establishing the SIP call, client device 210 may register with IMS Core 250, such as via CSCF server 254, using the primary identifier associated with client device 210. The multimedia session may be used for purposes such as, but not limited to, voice conferencing, video conferencing, streaming multimedia distribution, instant messaging, presence information, file transfer, fax over IP, and online gaming. Client device 210 may initiate the multimedia session (for example, by transmitting a SIP INVITE message to initiate a SIP call). Endpoint 275 may initiate the multimedia session (for example, by transmitting a SIP INVITE message to initiate a SIP call). Once the multimedia session has been established, client device 210 and endpoint 275 may exchange data according to a predetermined protocol (for example, RTL (Real-time Transport Protocol) may be used for VoLTE (Voice Over LTE)) via first communication network 220 and WAN 270, with data transmitted by endpoint 275 being directed to the first network address 212a (illustrated as "@addr4" in FIG. 2).

During a second time period t5, after time period t4, client device 210 is connected to, and transfers data via, a second communication network 222 that is different than first communication network 220. In some examples, second communication network 222 may be a cellular data network. The connection of client device 210 to second communication network 222 may be a result of client device 210 physically moving within range of second communication network 222 (where, for example, second communication network 222 provides a wireless networking connection for client device 210) and/or client device 210 being physically attached to second communication network 222 (for example, by attachment of a cable to client device 210). The connection of client device 210 to second communication network 222 may be a result of losing the connection between client device 210 and first communication network 220. For example, client device 210 may be configured to connect to a cellular data network if it loses an initial connection with a WiFi network. In some situations, there may be a period of time between period t4 and period t5 when client device 210 is connected to neither first communication network 220 nor second communication network 222. For example, if a multimedia session is initiated while client device 210 is connected to first communication network 220, after which client device 210 is not connected to any network for a brief period of time (such as less than a timeout period for the multimedia session), and then client device 210 connects to second communication network 222, the multimedia session may be continued via the second communication network 222. In some situations, during a portion or all of time period t5, client device 210 may be connected to both first communication network 220 and second communication network 222. For example, first communication network 220 may be a cellular data network with a wide coverage area and second communication network 222 may be WiFi network with a more limited coverage area. In such situations, client device 210 may be configured to preferentially use second communication network 222, rather than first communication network 220, for some or all data communications. For example, WiFi network usage may be preferred over cellular data network usage, to avoid incurring usage cellular data network resources. In some situations, the connection between client device 110 and first communication network 220 may be terminated in response to connecting to second communication network 222. For example, communication may be performed via second communication network 222 using less power than if performed via first communication network 220.

Second communication network 222 is connected to WAN 270, such that second communication network 222 may transfer data to and from WAN 270 and devices connected to WAN 270, such as endpoint 275. Accordingly, via second communication network 222, client device 210 may also transfer data to and from WAN 270 and devices connected to WAN 270 during the time period t5 that client device 210 is connected to second communication network 222. While client device 210 is connected to the second communication network 222, client device 210 is associated with a second network address 212b on WAN 270, illustrated by "@addr5," that is different from the first network address 212a, such that data may be provided, by endpoint 275, for example, to client device 210 by directing it to the second network address 212b on WAN 270. In some examples, the second communication network 222 may perform network address translation (NAT), much as discussed above with respect to the first communication network 120.

Client device 210 is configured to determine when client device 210 has connected to second communication network 222. For example, an operating system software executing on client device 210 may be configured to configure and control communication hardware to connect to second communication network 222, and in response to connecting to second communication network 222 provide a notification to software on client device 210 that client device 210 has connected to second communication network 222. In response to determining client device 210 has connected to second communication network 222, client device 210 may be configured to register or authenticate with IMS Core 250, such as via HSS/AAA server 252 or CSCF server 254, using the alternate identifier associated with client device 210. This registration or authentication may be performed via second communication network 222, WAN 270, and A-SBC 260.

In response to determining client device 210 has connected to second communication network 222 while the multimedia session initially established via first communication network 220 is ongoing, client device 210 is configured to issue a request, transmitted via second communication network 222, for the endpoint of the multimedia session terminating at client device 210 (specifically, client device 210 serving as an endpoint via the first communication network 220) to be replaced with client device 210 serving as a replacement endpoint via the second communication network 222. This request may be transmitted to a component included in IMS Core 250 (such as AS 256) or endpoint 275. There are various techniques by which the request may be handled by various systems. In a first example, endpoint 275 may receive the request, or another request issued by another system that received the original request, and in response establish a new communication session between itself and client device 210 via the second communication network 222 to replace a communication session previously established between itself and client device 210 via the first communication network 220. In a second example, the multimedia session may pass through a proxy server, and the proxy server may be configured to transfer data between endpoint 275 and client device 210 via second communication network 222, rather than between endpoint 275 and client device 210 via first communication network 220, such that endpoint 275 does not need to change the destination to which it transmits data. In a third example, a network element located in second communication network 222, WAN 270, or between WAN 270 and endpoint 275 may be configured to perform network address translation, such that the same network addresses continue to be used by client device 210 and endpoint 275 for transferring data for the multimedia session, but the network element redirects data directed to the first network address 212a to instead go to the second network address 212b. These are merely examples, and other methods may be used.

As a result of the request being successfully processed, data transmitted by endpoint 275 for the multimedia session is no longer delivered to the first network address 212a, but instead is delivered to the second network address 212b. Accordingly, the multimedia session between client device 210 and endpoint 275 continues via the second communication network 222. In some situations, such as where the multimedia session is used for real time streaming of audio and/or video data, there may be a period during which the multimedia stream is interrupted and real time streaming does not occur. In some situations, interruptions in the multimedia session due to handover from one endpoint to another may be addressed by advance buffering or retries.

During a third time period t6, after time period t5, client device 210 may be connected to, and transfer data via, a third communication network 224 that is different than second communication network 222. The connection of client device 210 to third communication network 224 may be a result of client device 110 physically moving within range of third communication network 224 (where, for example, third communication network 224 provides a wireless networking connection for client device 210) and/or client device 110 being physically attached to third communication network 224 (for example, by attachment of a cable to client device 210). The connection of client device 210 to third communication network 224 may be a result of losing the connection between client device 210 and second communication network 222. In some situations, there may be a period of time between period t5 and period t6 when client device 210 is connected to neither second communication network 222 nor third communication network 224. In some situations, during a portion or all of time period t6, client device 210 may be connected to both second communication network 222 and third communication network 224, or to both first communication network 220 and third communication network 224. In such situations, client device 210 may be configured to preferentially use third communication network 224, rather than second communication network 222 or first communication network 220, for some or all data communications. In some situations, the connection between client device 210 and second communication network 222 may be terminated in response to connecting to third communication network 224.

Third communication network 224 is connected to WAN 270, such that third communication network 224 may transfer data to and from WAN 270 and devices connected to WAN 270, such as endpoint 270. Accordingly, via third communication network 224, client device 210 may also transfer data to and from WAN 270 and devices connected to WAN 270 during the time period t6 that client device 210 is connected to third communication network 224. While client device 210 is connected to the third communication network 224, client device 210 is associated with a third network address 212c on WAN 270, illustrated by "@addr6," that is different from the second network address 212b, such that data may be provided, by endpoint 275, for example, to client device 210 by directing it to the third network address 212c on WAN 270. In some examples, the third communication network 224 may perform network address translation (NAT), much as discussed above with respect to the first communication network 120.

Client device 210 is configured to determine when client device 210 has connected to third communication network 224. For example, an operating system software executing on client device 210 may be configured to configure and control communication hardware to connect to third communication network 224, and in response to connecting to third communication network 224 provide a notification to software on client device 210 that client device 210 has connected to third communication network 224. In response to determining client device 210 has connected to third communication network 222, client device 210 may be configured to register or authenticate with IMS Core 250, such as via HSS/AAA server 252 or CSCF server 254, using the primary identifier associated with client device 210. This registration or authentication may be performed via second communication network 224, WAN 270, and A-SBC 260.

In response to determining client device 210 has connected to third communication network 224 while the multimedia session initially established via first communication network 220 is ongoing, client device 210 is configured to issue a request, transmitted via third communication network 224, for the endpoint of the multimedia session terminating at client device 210 (specifically, client device 210 serving as an endpoint via the second communication network 220) to be replaced with client device 210 serving as a replacement endpoint via the third communication network 224. This request may be transmitted to a component included in IMS Core 250 (such as AS 256) or endpoint 275. As a result of the request being successfully processed, data transmitted by endpoint 275 for the multimedia session is no longer delivered to the second network address 212b, but instead is delivered to the third network address 212c. Accordingly, the multimedia session between client device 210 and endpoint 275 continues via the third communication network 224.

It is noted that although in the example illustrated in FIG. 2 client device 210 connects first to first communication network 260, this is merely illustrative. For example, client device 210 may instead first connect to second communication network 262, establish a multimedia session via second communication network 262, then connect to first communication network 260 and continue the multimedia session via first communication network 260.

Figure 3:
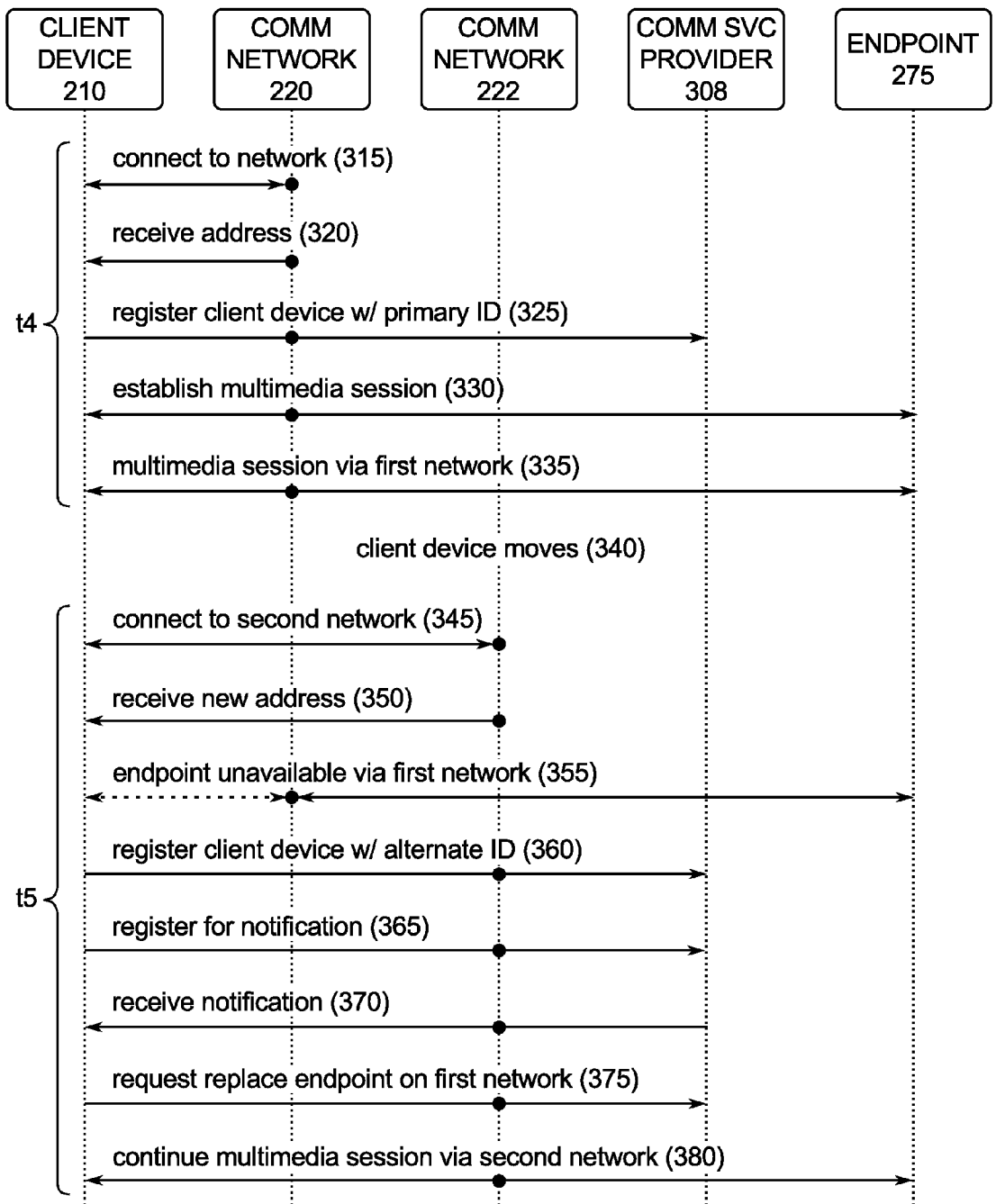
FIG. 3 illustrates a process in which a multimedia session initially established via a first communication network may be continued after a client device connects to a second communication network.

FIG. 3 illustrates a process in which a multimedia session initially established via a first communication network 220 may be continued after a client device 210 connects to a second communication network 222. Although the example illustrated in FIG. 3 involves components illustrated in FIG. 2, similar techniques may also be applied involving the components illustrated in FIG. 1. At 315, client device 210 establishes a connection with first communication network 220. Prior to 315, client device 210 may have obtained a primary identifier and an alternate identifier associated with client device 210 by communicate service provider 240. At 320, client device may receive first network address 212a, which may be used by client device 210 in its interactions with other components illustrated in FIG. 2. At 325, in response to determining that client device 210 has connected to first communication network 220, client device 210 may register and/or authenticate itself with communication service provider 240. For example, client device 210 may register and/or authenticate itself with IMS Core 250 (for example, with HSS/AAA server 252 or CSCF server 254), using the primary identifier associated with client device 210. In some implementations, the registration and/or authentication may be performed by sending a SIP REGISTER message from client device 210 to CSCF server 254. In some implementations, the SIP REGISTER message may include the primary identifier. In some implementations, the SIP REGISTER message may include a SIP UUID generated by client device 210 based on one or more portions of the primary identifier. For example, if the primary identifier associated with client device 210 is "000-2225551212-01," the generated SIP UUID might be "00000000-0000-0000-0000-222555121201." The content of the UUID may be a function of MDN and the primary or alternate identifier to better ensure the generated UUID is unique.

At 330, a multimedia session is established, via first communication network 220, between client device 210 and endpoint 275, with client device 210 (via first communication network 220) and endpoint 275 each acting as endpoints of the multimedia session. For example, client device 210 may transmit a SIP INVITE message or endpoint 275 may transmit a SIP INVITE message in order to establish a SIP call between client device 210 and endpoint 275. As a result, at 335 a multimedia session is established and continues via first communication network 220.

At 340, the client device 210 may move to a new location, which may change which access networks are available to client device 210. In some situations, network conditions may change without client device 210 moving location. At 345, client device 210 establishes a connection with second communication network 222. At 350, client device 210 may receive second network address 212b, which may be used by client device 210 in its interactions with other components illustrated in FIG. 2. At 355, depending on the situation, client device 210 may no longer be available as an endpoint for the multimedia session via first communication network 220. For example, client device 210 may no longer be connected to first communication network 220, and as a result data packets can no longer be exchanged between client device 210 and endpoint 275 via first communication network 220, and first network address 212a may no longer be effective for endpoint 275 to communicate with client device 210.

At 360, in response to determining that client device 210 has connected to second communication network 220, client device 210 may again register and/or authenticate itself with communication service provider 240. For example, client device 210 may register and/or authenticate itself with IMS Core 250 (for example, with HSS/AAA server 252 or CSCF server 254), using the alternate identifier associated with client device 210. After doing so, particularly if done before any timeout situation occurs with respect to client device 210 having been connected via first communication network 220, it may appear to one or more components operated by communication service provider 240 that two devices—one with the primary identifier (due to the registration and/or authentication performed at 325) and the other with the alternate identifier (due to the registration and/or authentication performed at 360)—are active. In some implementations, the registration and/or authentication may be performed by sending a SIP REGISTER message from client device 210 to CSCF server 254 transmitted via second communication network 222. In some implementations, the SIP REGISTER message may include the alternate identifier. In some implementations, the SIP REGISTER message may include a SIP UUID generated by client device 210 based one or more portions of the alternate identifier. For example, if the alternate identifier associated with client device 210 is "000-2225551212-10," the generated SIP UUID might be "00000000-0000-0000-0000-222555121210." Additionally, in response to the multimedia session established at 330 being ongoing, the SIP REGISTER message may include a handoff header, such as P-COM.HANDOFF, to indicate an intent to perform a handoff of the multimedia session from the first communication network 220 to the second communication network 222.

At 365, client device 210 may register or subscribe with communication service provider 240 for notification of any ongoing multimedia sessions. At this time, assuming a timeout has not occurred on the multimedia session established at 330, it is expected that the multimedia session 330 is ongoing. For example, client device 210 may transmit a SIP SUBSCRIBE message to AS 256 to subscribe to notifications of running calls or multimedia sessions. IEEE RFC 4235 (entitled "An INVITE-Initiated Dialog Event Package for the Session Initiation Protocol (SIP)") and IEEE RFC 6665 (entitled "SIP-Specific Event Notification"), which are each incorporated by reference herein in their entireties, discuss the use of SIP SUBSCRIBE and NOTIFY messages for a dialog event package which allows for subscription to notifications in change of state.

At 370, if client device 210 registered or subscribed with communication service provider 240 at 365, client device 210 receives a notification that the multimedia session established at 330 is ongoing. For example, client device may receive a NOTIFY dialog event indicating a running call. In response to receiving the notification at 370, the process may proceed to 375.

At 375, client device 210 transmits a request, via second communication network 222, to communication service provider 240 that an endpoint of the multimedia session (specifically, client device 210 serving as an endpoint via the first communication network 220) be replaced with client device 210 serving as a replacement endpoint of the multimedia session via the second communication network 222. As a result of that replacement being performed, instead of data for the multimedia session being sent from endpoint 275 to client device 210 via first communication network 220, as was initially done at 335, such data for the multimedia session will be sent via second communication network 222 that client device 210 has connected to. For example, the request may be sent from client device 210 to AS 256. To avoid the replacement being performed for the wrong multimedia session (as in some situations an account, user, or user device may have more than one ongoing multimedia session at a given time), client device 210 may be configured to utilize SIP UUID values and/or To/From SIP headers to ensure that the multimedia session established at 330 is correctly identified. Accordingly, the multimedia session initiated at 335 via first communication network 220 then automatically continues via second communication network 222 at 380.

Although not illustrated in FIG. 3, in the event that the multimedia session continued at 380 ends during time period t5 while client device 210 is connected to second communication network 222, client device 210 may be configured to reregister with communication service provider 240 using the primary identifier (and possibly a SIP UUID based on the primary identifier), much as discussed at 325.

Figure 4:
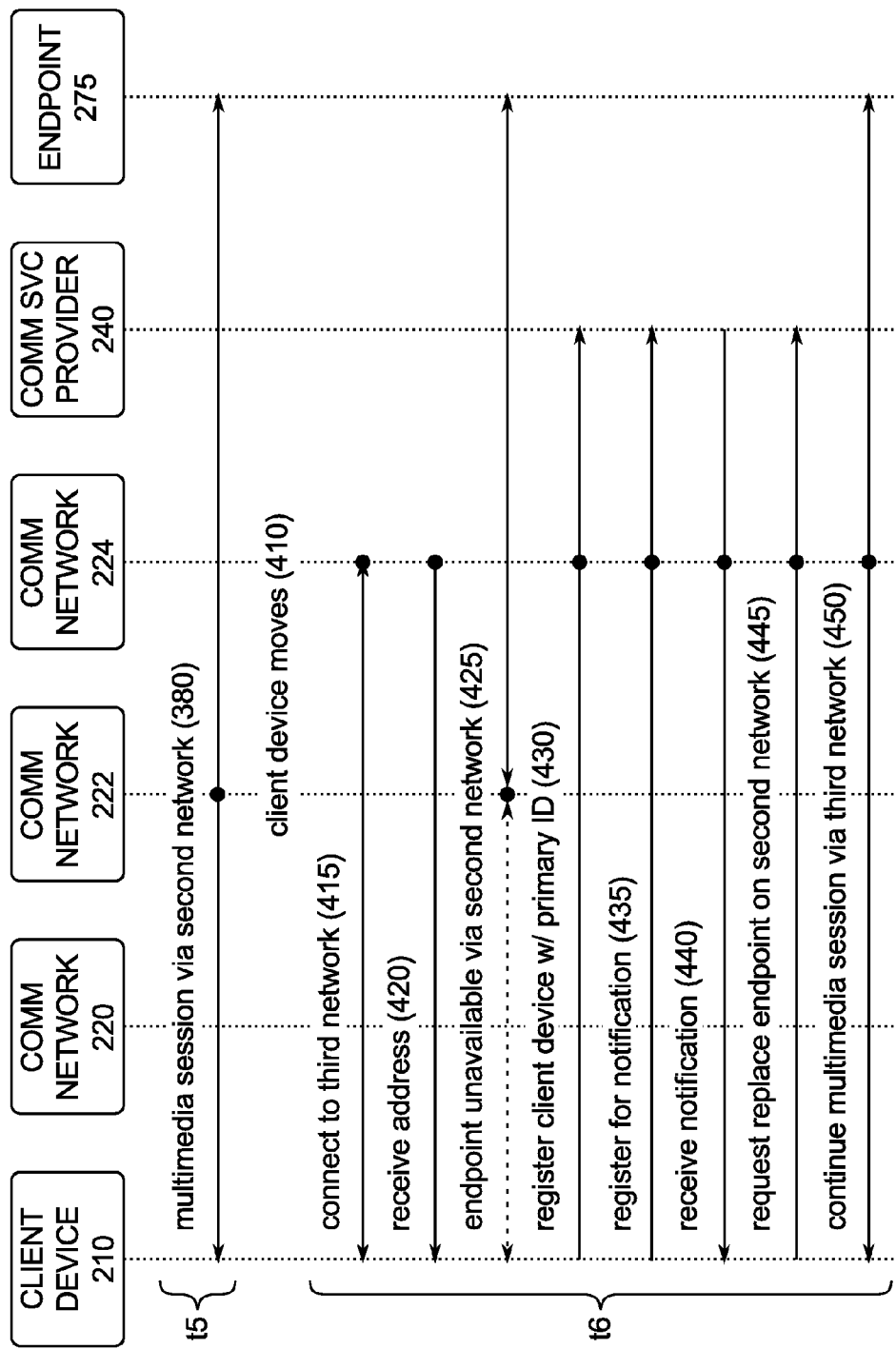
FIG. 4 illustrates a process in which the multimedia session illustrated in FIG. 3 may be continued after the client device connects to a third communication network.

FIG. 4 illustrates a process in which the multimedia session illustrated in FIG. 3 may be continued after the client device 210 connects to a third communication network 224. Although the example illustrated in FIG. 4 involves components illustrated in FIG. 2, similar techniques may also be applied involving the components illustrated in FIG. 1. At 380, as discussed above, the multimedia session initiated at 335 via first communication network 220 has been continued via second communication network 222.

At 410, the client device 210 may move to a new location, which may change which access networks are available to client device 210. In some situations, network conditions may change without client device 210 moving location. At 415, client device 210 establishes a connection with third communication network 224. At 420, client device 210 may receive third network address 212c, which may be used by client device 210 in its interactions with other components illustrated in FIG. 2. At 425, depending on the situation, client device 210 may no longer be available as an endpoint for the multimedia session via second communication network 222. For example, client device 210 may no longer be connected to second communication network 220, and as a result data packets can no longer be exchanged between client device 210 and endpoint 275 via second communication network 222, and second network address 212b may no longer be effective for endpoint 275 to communicate with client device 210.

At 430, in response to determining that client device 210 has connected to third communication network 220, client device 210 may again register and/or authenticate itself with communication service provider 240. For example, client device 210 may register and/or authenticate itself with IMS Core 250 (for example, with HSS/AAA server 252 or CSCF server 254), using the primary identifier associated with client device 210. After doing so, particularly if done before any timeout situation occurs with respect to client device 210 having been connected via second communication network 222, it may appear to one or more components operated by communication service provider 240 that two devices—one with the alternate identifier (due to the registration and/or authentication performed at 360) and the other with the primary identifier (due to the registration and/or authentication performed at 430)—are active. In some implementations, the registration and/or authentication may be performed by sending a SIP REGISTER message from client device 210 to CSCF server 254 transmitted via third communication network 222. In some implementations, the SIP REGISTER message may include the primary identifier. In some implementations, the SIP REGISTER message may include a SIP UUID generated by client device 210 based one or more portions of the primary identifier. For example, if the primary identifier associated with client device 210 is "000-2225551212-01," the generated SIP UUID might be "00000000-0000-0000-0000-222555121201." Additionally, in response to the multimedia session established at 330 and continued at 380 being ongoing, the SIP REGISTER message may include a handoff header, such as P-COM.HANDOFF, to indicate an intent to perform a handoff of the multimedia session from the second communication network 222 to the second communication network 224. In response to the presence of the P-COM HANDOFF header, a receiving network element or other network element may identify the SIP registration action for operation and management (OAM) purposes, such as billing or applying conditions or treatments in association with the action.

At 435, client device 210 may register or subscribe with communication service provider 240 for notification of any ongoing multimedia sessions, in much the same manner done at 365. At 440, if client device 210 registered or subscribed with communication service provider 240 at 435, client device 210 receives a notification that the multimedia session established at 330 (via first communication network 220) and continued at 380 (via second communication network 222) is ongoing, in much the same manner described at 370. In response to receiving the notification at 440, the process may proceed to 445.

At 445, client device 210 transmits a request, via third communication network 224, to communication service provider 240 that an endpoint of the multimedia session (specifically, client device 210 serving as an endpoint via the second communication network 222) be replaced with client device 210 serving as a replacement endpoint of the multimedia session via the third communication network 224, much as discussed with respect to 375. As a result of that replacement being performed, instead of data for the multimedia session being sent from endpoint 275 to client device 210 via second communication network 222, as was done at 380, such data for the multimedia session will be sent via third communication network 224 that client device 210 has connected to. Accordingly, the multimedia session initiated at 335 via first communication network 220 and continued at 380 via second communication network 222 then automatically continues via third communication network 224 at 450.

Figure 5:
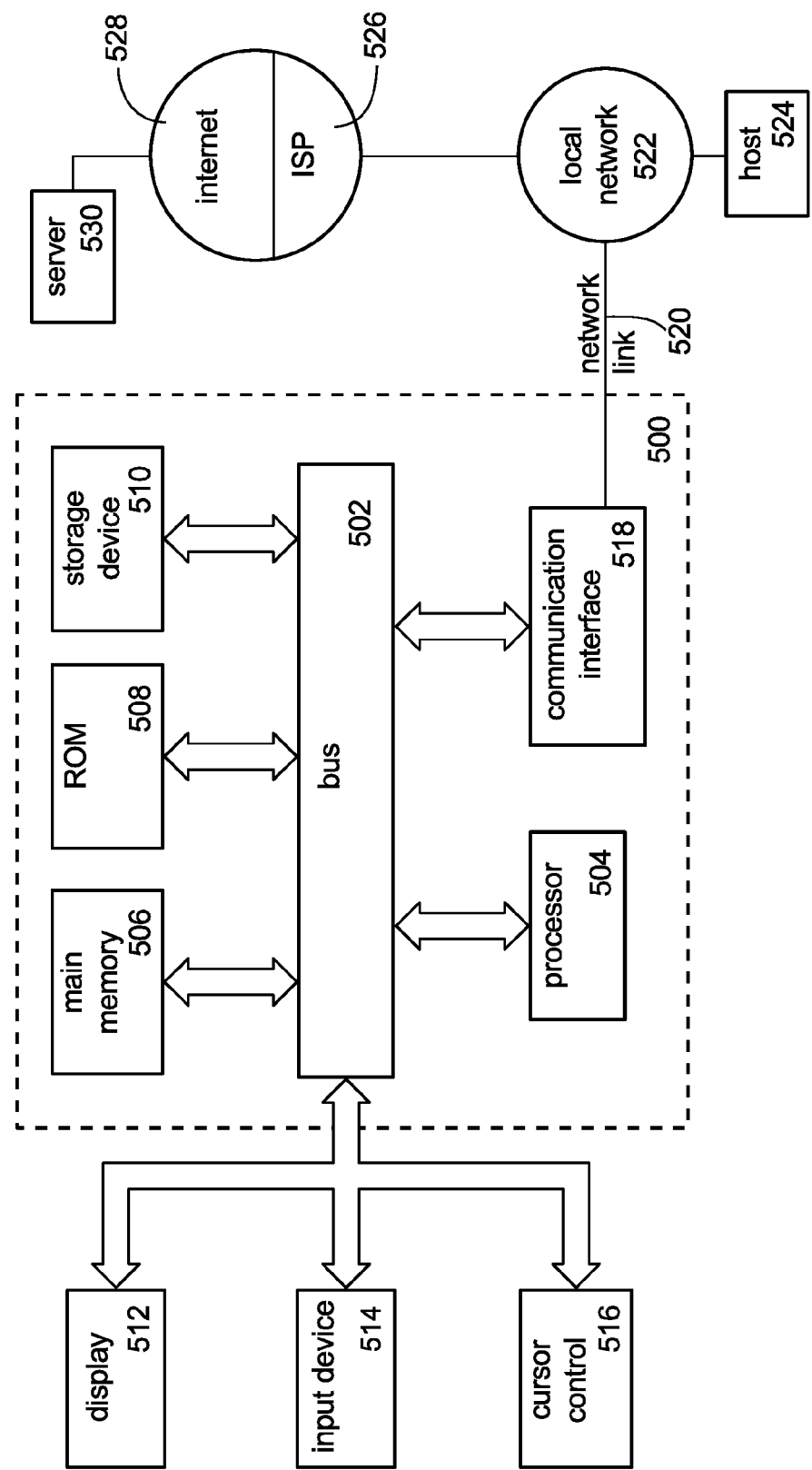
FIG. 5 is a block diagram that illustrates a computer system 500 upon which aspects of this disclosure may be implemented.

FIG. 5 is a block diagram that illustrates a computer system 500 upon which aspects of this disclosure may be implemented, such as, but not limited to, client devices 110 and 210, components of communication networks 120, 122, 124, 220, 222, and 224, endpoints 140 and 275, E-UTRAN 225, EPC 230 (including MME 232, PGW 234, and SGW 236), identifier generator 245, IMS Core 250 (including HSS/AAA server 252, CSCF server 254, and AS 256), and A-SBC 260. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Another type of user input device is a touchscreen, which generally combines display 512 with hardware that registers touches upon display 512.

This disclosure is related to the use of computer systems such as computer system 500 for implementing the techniques described herein. In some examples, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A device comprising:
   one or more processors;
   one or more machine readable media including instructions recorded therein which, when executed by the one or more processors, cause the one or more processors to:
   obtain a primary identifier for the device prior to establishing the multimedia session;
   obtain an alternate identifier for the device prior to establishing the multimedia session, wherein the alternate identifier is different than the primary identifier;
   determine that the device is connected to a first communication network;
   register, in response to determining that the device is connected to the first communication network, with a communication service provider using the primary identifier via the first communication network;
   establish, via the first communication network, a multimedia session with the device serving as a first endpoint of the multimedia session via the first communication network;
   determine that the device is connected to a second communication network while the multimedia session is ongoing, wherein the second communication network is different than the first communication network;
   register, in response to determining that the device is connected to the second communication network, with the communication service provider using the alternate identifier via the second communication network;
   request via the second communication network, in response to determining that the device is connected to the second communication network while the multimedia session is ongoing, that the first endpoint of the multimedia session be replaced with the device serving as a second endpoint of the multimedia session via the second communication network; and
   continue, after the request that the first endpoint of the multimedia session be replaced, the multimedia session via the second communication network.

2. The device of claim 1, wherein the instructions further cause the one or more processors to:
   determine that the device is connected to a third communication network while the multimedia session is ongoing, wherein the third communication network is different than the first communication network;
   register, in response to determining that the device is connected to the third communication network, with the communication service provider using the primary identifier via the third communication network;
   request, in response to determining that the device is connected to the third communication network while the multimedia session is ongoing, via the third communication network that the second endpoint of the multimedia session be replaced with the device serving as a third endpoint of the multimedia session via the second communication network; and
   continue, after the request that the second endpoint of the multimedia session be replaced, the multimedia session via the third communication network.

3. The device of claim 1, wherein the instructions further cause the one or more processors to:
   determine that the multimedia session has ended; and
   authenticate, in response to determining that the multimedia session has ended, with the communication service provider using the primary identifier via the second communication network.

4. The device of claim 1, wherein the instructions further cause the one or more processors to:
   obtain, in response to determining that the device is connected to the first communication network, a first network address for the device; and
   obtain, in response to determining that the device is connected to the second communication network, a second network address, wherein the second network address is different than the first network address.

5. The device of claim 1, wherein:
   the multimedia session is established in association with a user account;
   the instructions further cause the one or more processors to:
   register, in response to determining that the device is connected to the second communication network, with a service to receive notification of ongoing multimedia sessions associated with the user account, and
   receive a notification from the service that the multimedia session is ongoing; and
   the request that the first endpoint of the multimedia session be replaced is further performed in response to having received the notification.

6. A method comprising:
   determining that a device is connected to a first communication network;

establishing, via the first communication network, a multimedia session with the device serving as a first endpoint of the multimedia session via the first communication network;
determining that the device is connected to a second communication network while the multimedia session is ongoing, wherein the second communication network is different than the first communication network;
requesting via the second communication network, in response to determining that the device is connected to the second communication network while the multimedia session is ongoing, that the first endpoint of the multimedia session be replaced with the device serving as a second endpoint of the multimedia session via the second communication network; and
continuing, after the request that the first endpoint of the multimedia session be replaced, the multimedia session via the second communication network, wherein:
the multimedia session is established in association with a user account;
the method further comprises:
registering, in response to determining that the device is connected to the second communication network, with a service to receive notification of ongoing multimedia sessions associated with the user account, and
receiving a notification from the service that the multimedia session is ongoing; and
the request that the first endpoint of the multimedia session be replaced is further performed in response to having received the notification.

7. A nontransitory machine readable medium including instructions recorded therein which, when executed by one or more processors, cause the one or more processors to perform the method of claim 6.

8. The machine readable medium of claim 7, wherein the instructions further cause the one or more processors to:
obtain a primary identifier for the device prior to establishing the multimedia session;
obtain an alternate identifier for the device prior to establishing the multimedia session, wherein the alternate identifier is different than the primary identifier;
register, in response to determining that the device is connected to the first communication network, with a communication service provider using the primary identifier via the first communication network; and
register, in response to determining that the device is connected to the second communication network, with the communication service provider using the alternate identifier via the second communication network.

9. The machine readable medium of claim 8, wherein the instructions further cause the one or more processors to:
determine that the multimedia session has ended; and
authenticate, in response to determining that the multimedia session has ended, with the communication service provider using the primary identifier via the second communication network.

10. The machine readable medium of claim 7, wherein the instructions further cause the one or more processors to:
obtain, in response to determining that the device is connected to the first communication network, a first network address for the device; and
obtain, in response to determining that the device is connected to the second communication network, a second network address, wherein the second network address is different than the first network address.

11. A method comprising:
obtaining a primary identifier for a device prior to establishing the multimedia session;
obtaining an alternate identifier for the device prior to establishing the multimedia session, wherein the alternate identifier is different than the primary identifier;
determining that the device is connected to a first communication network;
registering, in response to determining that the device is connected to the first communication network, with a communication service provider using the primary identifier via the first communication network;
establishing, via the first communication network, a multimedia session with the device serving as a first endpoint of the multimedia session via the first communication network;
determining that the device is connected to a second communication network while the multimedia session is ongoing, wherein the second communication network is different than the first communication network;
registering, in response to determining that the device is connected to the second communication network, with the communication service provider using the alternate identifier via the second communication network;
requesting via the second communication network, in response to determining that the device is connected to the second communication network while the multimedia session is ongoing, that the first endpoint of the multimedia session be replaced with the device serving as a second endpoint of the multimedia session via the second communication network; and
continuing, after the request that the first endpoint of the multimedia session be replaced, the multimedia session via the second communication network.

12. The method of claim 11, further comprising:
determining that the device is connected to a third communication network while the multimedia session is ongoing, wherein the third communication network is different than the first communication network;
registering, in response to determining that the device is connected to the third communication network, with the communication service provider using the primary identifier via the third communication network;
requesting, in response to determining that the device is connected to the third communication network while the multimedia session is ongoing, via the third communication network that the second endpoint of the multimedia session be replaced with the device serving as a third endpoint of the multimedia session via the second communication network; and
continuing, after the request that the second endpoint of the multimedia session be replaced, the multimedia session via the third communication network.

13. The method of claim 11, further comprising:
determining that the multimedia session has ended; and
authenticating, in response to determining that the multimedia session has ended, with the communication service provider using the primary identifier via the second communication network.

14. The method of claim 11, further comprising:
obtaining, in response to determining that the device is connected to the first communication network, a first network address for the device; and
obtaining, in response to determining that the device is connected to the second communication network, a second network address, wherein the second network address is different than the first network address.

15. The method of claim 11, wherein:
the multimedia session is established in association with a user account;
the method further comprises:
   registering, in response to determining that the device is connected to the second communication network, with a service to receive notification of ongoing multimedia sessions associated with the user account, and
   receiving a notification from the service that the multimedia session is ongoing; and
the request that the first endpoint of the multimedia session be replaced is further performed in response to having received the notification.

16. A nontransitory machine readable medium including instructions recorded therein which, when executed by one or more processors, cause the one or more processors to perform the method of claim 11.

17. The machine readable medium of claim 16, wherein the instructions further cause the one or more processors to:
   determine that the device is connected to a third communication network while the multimedia session is ongoing, wherein the third communication network is different than the first communication network;
   register, in response to determining that the device is connected to the third communication network, with the communication service provider using the primary identifier via the third communication network;
   request, in response to determining that the device is connected to the third communication network while the multimedia session is ongoing, via the third communication network that the second endpoint of the multimedia session be replaced with the device serving as a third endpoint of the multimedia session via the second communication network; and
   continue, after the request that the second endpoint of the multimedia session be replaced, the multimedia session via the third communication network.

18. The machine readable medium of claim 16, wherein the instructions further cause the one or more processors to:
   determine that the multimedia session has ended; and
   authenticate, in response to determining that the multimedia session has ended, with the communication service provider using the primary identifier via the second communication network.

19. The machine readable medium of claim 16, wherein the instructions further cause the one or more processors to:
   obtain, in response to determining that the device is connected to the first communication network, a first network address for the device; and
   obtain, in response to determining that the device is connected to the second communication network, a second network address, wherein the second network address is different than the first network address.

20. The machine readable medium of claim 16, wherein:
the multimedia session is established in association with a user account;
the instructions further cause the one or more processors to:
   register, in response to determining that the device is connected to the second communication network, with a service to receive notification of ongoing multimedia sessions associated with the user account, and
   receive a notification from the service that the multimedia session is ongoing; and
the request that the first endpoint of the multimedia session be replaced is further performed in response to having received the notification.

* * * * *